United States Patent
Zheng

(10) Patent No.: US 10,976,850 B2
(45) Date of Patent: Apr. 13, 2021

(54) TOUCH PANEL AND MANUFACTURING METHOD THEREOF

(71) Applicant: WUHAN CHINA STAR OPTOELECTRONICS TECHNOLOGY CO., LTD, Hubei (CN)

(72) Inventor: Yingbo Zheng, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 0 days.

(21) Appl. No.: 16/631,179

(22) PCT Filed: Oct. 29, 2019

(86) PCT No.: PCT/CN2019/113927
§ 371 (c)(1),
(2) Date: Jan. 15, 2020

(87) PCT Pub. No.: WO2021/017223
PCT Pub. Date: Feb. 4, 2021

(65) Prior Publication Data
US 2021/0034182 A1    Feb. 4, 2021

(30) Foreign Application Priority Data
Jul. 29, 2019  (CN) .......................... 201910688646.6

(51) Int. Cl.
*G06F 3/041*      (2006.01)
*F21V 8/00*       (2006.01)
*G02F 1/1335*     (2006.01)
*G02F 1/13357*    (2006.01)
*G02B 5/02*       (2006.01)

(52) U.S. Cl.
CPC ........... *G06F 3/0412* (2013.01); *G02B 6/003* (2013.01); *G02B 6/0025* (2013.01); *G02F 1/133514* (2013.01); *G02F 1/133536* (2013.01); *G02F 1/133605* (2013.01); *G02F 1/133606* (2013.01);
(Continued)

(58) Field of Classification Search
CPC ......... G02F 1/133606; G02F 1/133605; G02F 2001/133607; G02B 6/0025; G02B 6/003
See application file for complete search history.

(56) References Cited

U.S. PATENT DOCUMENTS 9,634,203 B2    4/2017  Ito et al.
10,288,968 B2 *  5/2019 Weindorf ............ G02F 1/13475
(Continued)

FOREIGN PATENT DOCUMENTS

CN    201918420 U    8/2011
CN    102749747 A   10/2012
(Continued)

*Primary Examiner* — Donald L Raleigh
(74) *Attorney, Agent, or Firm* — Mark M. Friedman

(57) ABSTRACT

A touch panel and a manufacturing method thereof are provided. The touch panel includes a backlight module, a first assembly, and a second assembly. The first assembly includes a first polarizer and a color filter substrate. The second assembly includes an array substrate and a second polarizer. The first polarizer, the color filter substrate, the second polarizer, and the array substrate are disposed on an upper surface of the backlight module.

8 Claims, 4 Drawing Sheets

(52) U.S. Cl.
   CPC .......... *G02B 5/02* (2013.01); *G02F 1/133607* (2021.01); *G06F 2203/04103* (2013.01)

(56) References Cited

U.S. PATENT DOCUMENTS

| | | |
|---|---|---|
| 2013/0300952 A1 | 11/2013 | Yeh et al. |
| 2015/0009444 A1* | 1/2015 | Zhao ................. G02F 1/133528 349/43 |
| 2015/0153607 A1 | 6/2015 | Chen et al. |
| 2015/0287893 A1 | 10/2015 | Huang et al. |
| 2016/0363792 A1 | 12/2016 | Zhou |
| 2017/0285398 A1* | 10/2017 | Umeda ............. G02F 1/133528 |
| 2019/0204669 A1* | 7/2019 | Lee .......................... H01L 24/86 |

FOREIGN PATENT DOCUMENTS

| | | | | |
|---|---|---|---|---|
| CN | 102809841 A | 12/2012 | | |
| CN | 103199185 A | 7/2013 | | |
| CN | 104123054 A | 10/2014 | | |
| CN | 104460081 A | 3/2015 | | |
| CN | 104979457 A | 10/2015 | | |
| CN | 105449077 A | 3/2016 | | |
| JP | 2015018947 A | 1/2015 | | |
| KR | 20170037587 A * | 4/2017 | ....... | G02F 1/136277 |
| WO | WO-2017087493 A1 * | 5/2017 | ......... | B29D 11/0073 |

\* cited by examiner

TOUCH PANEL AND MANUFACTURING METHOD THEREOF

FIELD OF DISCLOSURE

The present disclosure relates to the field of displays, and in particular to a touch panel and a manufacturing method thereof.

BACKGROUND

With development of electronic products such as mobile phones and tablets, a design of modules such as liquid crystal displays and touch panels has gradually developed toward size expansion and weight reduction.

Existing touch panels have a plurality of structural designs, one of which is a glass-glass (G+G) structure, that is, a glass cover is used to adhere to a glass functional sheet. A touch panel using this structure will have two layers of glasses, which is thick and heavy, and is not suitable for thin and light products. A glass-film-film (GFF) structure is subsequently developed, that is, a functional film replaces with a glass functional sheet, which is lighter and thinner than the glass. There is also a one glass solution (OGS) structure in which a functional sheet is fabricated on a glass cover. It has advantages in thickness, but user experience and strength properties of the OGS structure are difficult to achieve performances of the cover glass, so the OGS structure is not as good as the GFF structure. There are touch panel structures with a single-layer solution such as a cover glass/film sensor/multi ITO (GFM), which is a single-layer and multi-point solution, and a cover glass/film sensor (GF), which is a single-film solution, but they have drawbacks. The touch panel structures that high-end mobile phones are keen on are an on-cell structure and an in-cell structure. The on-cell structure and the in-cell structure can effectively reduce a thickness and increase a brightness (transmission rate) of a screen compared to the GFF technology. The difference is that functional sheets of a touch panel are integrated on a liquid crystal module (LCM).

As shown in FIG. 1, a touch panel of an on-cell structure or an in-cell structure includes a backlight module, a first polarizer 111, an array substrate 121, a color filter substrate 112, a second polarizer 122, a sealant 202, and a glass cover 201. A display panel is mainly composed of the array substrate and the color filter substrate for display. In a process of preparing the touch panel, a bonding process of the glass cover and the display panel is limited and materials used are also limited, thereby resulting in a limited thickness of an entire touch panel. At present, an overall thickness of the touch panel can only be greater than or equal to 1.65 mm, where a thickness of the glass cover is 0.55 mm, a thickness of the sealant is 0.1 mm, a thickness of the display panel is 0.4 mm, and a thickness of the backlight module is 0.61 mm. If users want to reduce a weight of the touch panel itself by further reducing the thickness of any components of the touch panel, it is easy to cause various drawbacks to the touch panel. For example, if the thickness of the glass cover is reduced from 0.55 mm to 0.4 mm, after the glass cover is attached to the display panel, surface yellow spots, stress marks, and the like are likely to occur due to uneven stress. Moreover, an overall warpage tolerance of the touch panel increases. If the thickness of the sealant is reduced, bubbles will be generated during a process of attaching the glass cover to the display panel such that the two are poorly attached and it cannot be mass-produced. If the thickness of the display panel is reduced, a broken rate of a cell will be greatly increased, and it is likely to cause unevenness in display, color mura and the like. If the thickness of the array substrate is reduced, a light effect is lowered, and a brightness of the touch panel is impaired, and a power consumption is increased. Therefore, the reduction of any components in the touch panel will result in poor overall performance of the touch panel, thereby decreasing a yield of the touch panel.

SUMMARY OF DISCLOSURE

An object of the present disclosure is to provide a touch panel and a manufacturing method thereof, which solves technical problems in the prior art that a thickness of a touch panel is large, which may cause yellow spots, stress marks, warpage tolerance, poor fit, color mura, etc. during reducing the thickness of the touch panel, which in turn leads to poor overall performance and low yield of the touch panel.

In order to achieve the above object, the present disclosure provides a touch panel, including a backlight module, a first assembly, and a second assembly. The first assembly is disposed on a surface of the backlight module. The second assembly is disposed on a surface of the first assembly away from the backlight module. The first assembly includes a first polarizer and a color filter substrate. The first polarizer is disposed on the surface of the backlight module. The color filter substrate is disposed on a surface of the first polarizer away from the backlight module. The second assembly includes an array substrate and a second polarizer. The array substrate is disposed on a surface of the color filter substrate away from the backlight module. The second polarizer is disposed on a surface of the array substrate away from the backlight module.

Furthermore, the backlight module includes a reflector, a light guide plate, a first prismatic lens, a diffusion sheet, and a second prismatic lens. The light guide plate is disposed on a surface of the reflector. The first prismatic lens is disposed on a surface of the light guide plate away from the reflector. The diffusion sheet is disposed on a surface of the first prismatic lens away from the reflector. The second prismatic lens is disposed on a surface of the diffusion sheet away from the reflector. The second prismatic lens is attached to the first polarizer.

Furthermore, a length of the color filter substrate is less than a length of the array substrate, and a width of the color filter substrate is less than a width of the array substrate.

Furthermore, the touch panel further includes a baseplate, a conducting layer, and an integrated circuit (IC) driver circuit unit. The reflector is mounted to a surface of the baseplate. One end of the conducting layer is attached to another surface of the array substrate, and another end of the conducting layer is connected to another surface of the baseplate. The IC driver circuit unit is mounted to the another surface of the baseplate and electrically connected to the conducting layer.

Furthermore, material of the conducting layer includes molybdenum oxide.

Furthermore, the first polarizer includes a multilayer reflective polarizer, and the second polarizer includes a hard-coating polarizer.

Furthermore, a thickness of the array substrate ranges from 0.35 mm to 0.45 mm, a thickness of the color filter substrate ranges from 0.095 mm to 0.11 mm, and a thickness of the second polarizer ranges from 0.20 mm to 0.22 mm.

Furthermore, a longitudinal cross-section of the second assembly is quadrangular including a long side and a short side, and the longitudinal cross-section of the second assembly includes a circular arc section disposed at a junction of the long side and the short side.

In order to achieve the above object, the present disclosure also provides a manufacturing method of a touch panel, including the following steps. A backlight module formation step is performed for forming a backlight module. A first assembly formation step is performed for forming a first assembly on an upper surface of the backlight module. A second assembly formation step is performed for forming a second assembly on an upper surface of the first assembly. In the first assembly formation step, the method includes following steps. A first polarizer formation step is performed for forming a first polarizer on the upper surface of the backlight module. A color filter substrate formation step is performed for forming a color filter substrate on an upper surface of the first polarizer. In the second assembly formation step, the method includes following steps. An array substrate formation step is performed for forming an array substrate on an upper surface of the color filter substrate. A second polarizer formation step is performed for forming a second polarizer on an upper surface of the array substrate.

Furthermore, in the second assembly formation step, the second assembly is ground and polished such that the second assembly includes a circular arc section at a corner of its longitudinal cross-section.

The present disclosure provides a touch panel and a manufacturing method thereof, which are designed by inverting a color filter substrate and an array substrate. That is, the array substrate is disposed on an upper surface of the color filter substrate to remove the prior art glass cover and sealant. The array substrate replaces the glass cover of the prior art. A size of the array substrate is the same as that of the prior art glass cover. While reducing an overall thickness of the touch panel, an overall performance of the touch panel is ensured, and a yield of the touch panel is maintained.

Figure 1:
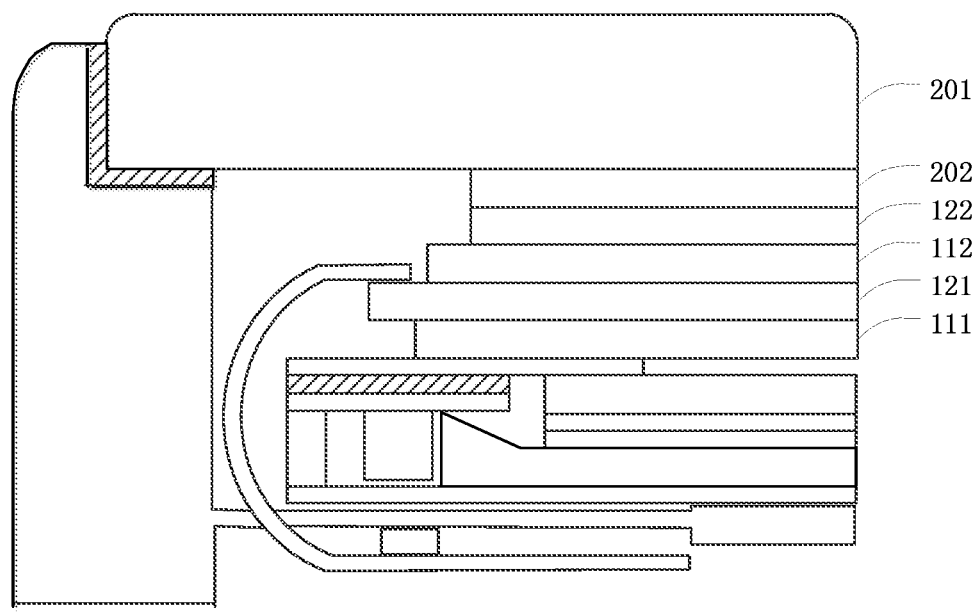
FIG. 1 is a schematic diagram of a touch panel of the prior art.

Reference numerals in the drawings are as follows: 11 first assembly; 12 second assembly; 111 first polarizer; 112 color filter substrate; 121 array substrate; 122 second polarizer; 1211 long side; 1212 short side; 100 circular arc section; 20 frame; 21 reflector; 22 light guide plate; 23 first prismatic lens; 24 diffusion sheet; 25 second prismatic lens; 26 light-shielding adhesive; 27 backlight source; 28 double-sided adhesive layer; 29 light source driving circuit; 31 conducting layer; 32 IC driver circuit unit; 41 side plate; 42 baseplate; 201 glass cover; 202 sealant

DETAILED DESCRIPTION

Preferred embodiments of the present disclosure are described below with reference to the accompanying drawings, which are used to exemplify the disclosure. The embodiments of the present disclosure can fully introduce technical content of the present disclosure to those skilled in the art, so that the technical content of the present disclosure is made clearer and easier to understand. However, the present disclosure may be embodied in many different forms of embodiments, and the scope of the disclosure is not limited to the embodiments mentioned herein.

An embodiment of the present disclosure provides a touch panel including a display module, a backlight module, a binding area, and a frame. The display module, the backlight module, and the binding area are all disposed within the frame. The display module is disposed on an upper surface of the backlight module.

Figure 2:
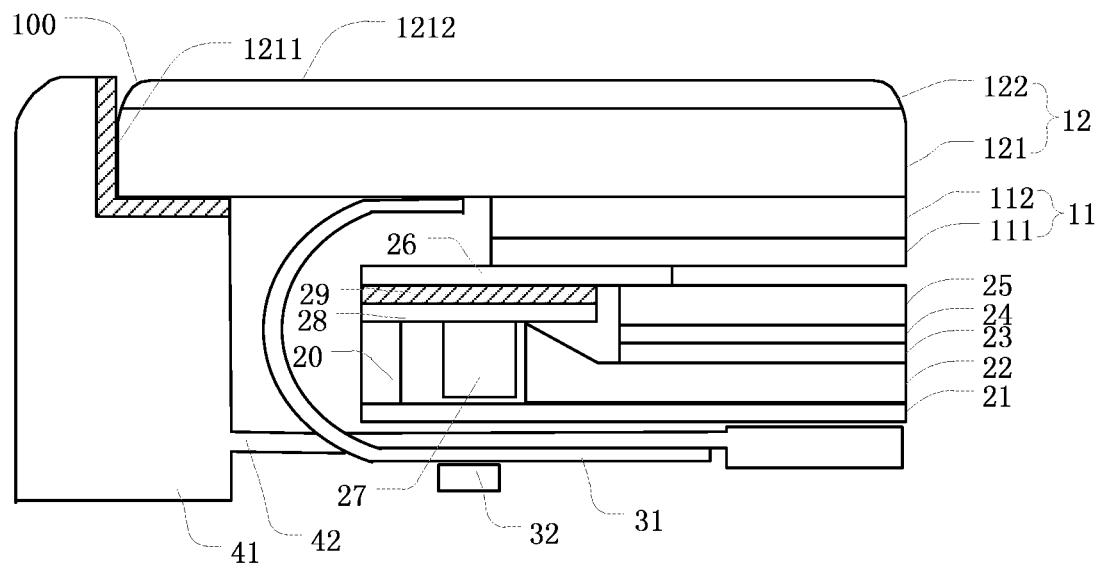
FIG. 2 is a schematic diagram of a touch panel of an embodiment of the present disclosure.
Figure 3:
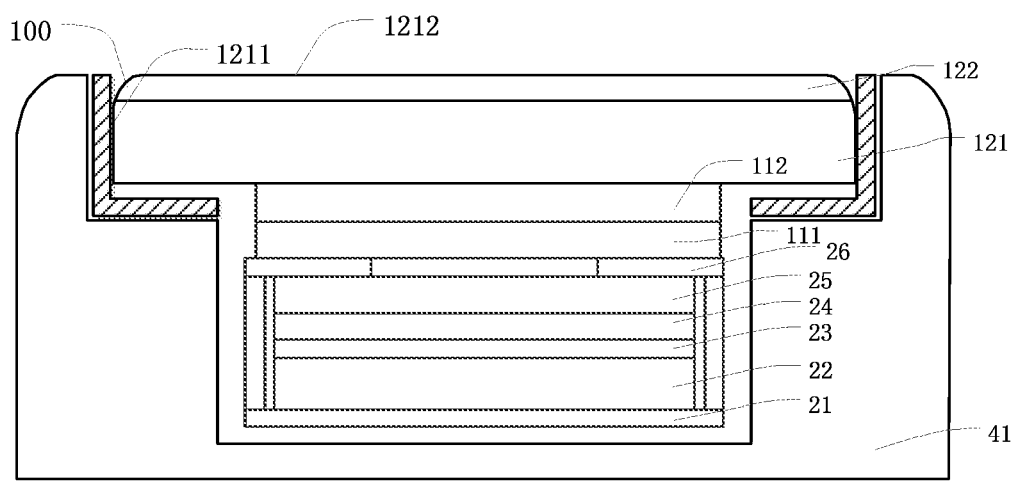
FIG. 3 is a cross-sectional view of the touch panel of the embodiment of the present disclosure.

As shown in FIG. 2 to FIG. 3, the display module includes a first assembly 11 and a second assembly 12. The second assembly 12 is disposed on an upper surface of the first assembly 11.

The first assembly 11 includes a first polarizer 111 and a color filter substrate 112 attached to an upper surface of the first polarizer 111. The first polarizer 111 is a multilayer reflective polarizer, and multi-films are usually attached to an absorption polarizer, which can significantly improve a backlight utilization of the display module. The color filter substrate 112 includes a color filter layer, and is configured to convert white light emitted by a light source into monochromatic lights such as red, green, and blue, thereby realizing color display. A thickness of the color filter substrate 112 ranges from 0.095 mm to 0.11 mm. Preferably, the thickness is 0.1 mm. In the prior art, a thickness of a color filter substrate is generally greater than 0.125 mm. Therefore, the color filter substrate in this embodiment is thinner and lighter than the color filter substrate in the prior art.

The second assembly 12 includes an array substrate 121 and a second polarizer 122, and the second polarizer 122 is attached to an upper surface of the array substrate 121. The array substrate 121 includes a plurality of layer structures such as a gate layer, a gate insulating layer, an active layer, a passivation layer, and a source/drain layer. A thickness of the array substrate 121 ranges from 0.35 mm to 0.45 mm. Preferably, the thickness is 0.4 mm or 0.41 mm. The array substrate 121 in this embodiment replaces a glass substrate in the prior art, and the touch panel can be made thinner and lighter. A thickness of the second polarizer 122 ranges from 0.20 mm to 0.22 mm, and the thickness is preferably 0.211 mm or 0.215 mm. The second polarizer 122 is a hard-coating polarizer which is subjected to a hardened coating treatment that guarantees a hardness of 8H on its surface, thereby ensuring the hardness of the touch panel. In this embodiment, a length of the array substrate 121 corresponds to a length of the second polarizer 122 to ensure that the second polarizer 122 completely covers the array substrate 121.

Furthermore, a longitudinal cross-section of the second assembly 12 is a quadrilateral including long sides 1211 and short sides 1212. Since the second assembly 12 includes the array substrate 121 and the second polarizer 1212, the long side 1121 is a long side of the second polarizer 1212, and the short side 1212 is a sum of short sides of the array substrate 121 and the second polarizer 122. In this embodiment, the longitudinal cross-section of the second assembly 12 further includes a circular arc section 100 disposed at a junction of one of the long sides 1211 and one of the short sides 1212. The circular arc section 100 extends from the second polarizer 122 to the array substrate 121. A radius of the circular arc section 100 ranges from 0.13 mm to 0.16 mm, and the radius is preferably 0.15 mm, which makes an edge of the display module smoother and prevents a risk of a screen being broken. In another embodiment, the circular arc section 100 may be disposed only at a corner of the second polarizer 122 (i.e., a junction of the long side 1211 and the short side 1212 of the second polarizer 122), as long as the edge of the display module can be smoother.

Furthermore, a length of the color filter substrate 112 is less than a length of the array substrate 111. A width of the color filter substrate 112 is less than a width of the array substrate 111. Since the array substrate 111 replaces the glass substrate in the prior art, it prevents an occurrence of yellow spots and stress marks, thereby ensuring a yield of the touch panel and an overall performance of the touch panel.

Referring to FIG. 2, the backlight module includes a reflector 21, a light guide plate 22, a first prismatic lens 23, a diffusion sheet 24, a second prismatic lens 25, and a light-shielding adhesive 26 in this order from bottom to top. The reflector 21 is configured to reflect light and has good reflective performance. The light guide plate 22 utilizes an optical grade acrylic plate to absorb the light from lamps on a surface of the optical grade acrylic plate. After light transmits to each light guide point, the reflected light will diffuse at various angles, and then the reflected light destroys a reflection condition and is emitted from a front of the light guide plate. The light guide plate can be uniformly illuminated by a plurality of light guide points which have different size of different density. The first prismatic lens 23 enhances a brightness of the touch panel. The diffusion sheet 24 provides a uniform surface light source for the touch panel. The second prismatic lens 25 is attached to a lower surface of the first polarizer 111 by the light-shielding adhesive 26, which also enhances the brightness of the touch panel. A lighting effect of the backlight module 112 will directly affect a visual effect of the touch panel.

Referring to FIG. 2, the backlight module further includes a backlight source 27, a double-sided adhesive layer 28, a light source driving circuit 29, and a frame 20. The backlight source 27 has characteristics of high brightness, long lifespan, and uniform illumination. The backlight source 27 provides a light source for the backlight module 2, which is disposed on a left side of the light guide plate 22 and is disposed on a lower surface of the double-sided adhesive layer 28. A lower surface of the light source driving circuit 29 is connected to an upper surface of the double-sided adhesive layer 28. An upper surface of the light source driving circuit 29 is connected to a lower surface of the light-shielding adhesive 26. The light source driving circuit 29 drives the backlight source to illuminate, which in turn affects the visual effect of the touch panel. The backlight source 2 includes the frame 20. The frame 20 is disposed between the reflector 21 and the double-sided adhesive layer 28 to support the components above the double-sided adhesive layer 28 and to ensure that more light sources are incident on the light guide plate 22.

Referring to FIG. 2, the binding area includes a conducting layer 31 and an IC driver circuit unit 32. The conducting layer 31 includes a chip on film (COF) and a flexible printed circuit (FPC). The COF is attached to the FPC. Material of the conducting layer 31 includes molybdenum oxide. The material has good uniformity on a surface of a glass and high reflectivity in a visible range. It can solve the technical problem that the conducting layer in the display module will reflect, and it ensure that the touch panel has a good display performance.

Referring to FIG. 2, the frame includes two opposite side plates 41 and a base plate 42. Each of the side plate 41 has a right angle section above it. The right angle section supports the array substrate 121 and the second polarizer 122. The right angle section includes a side edge and a bottom edge. The side edge is attached to a side of the second assembly by a glue layer. The baseplate is attached to a portion of a bottom of the array substrate by a sealant. The baseplate 42 is disposed between the two side plates 41 and is perpendicular to the side 42. The reflector 21 is mounted to an upper surface of the baseplate 42.

One end of the conducting layer 31 is attached to a lower surface of the array substrate 121, and the other end is connected to a lower surface of the baseplate 42. A middle of the conducting layer 31 is subjected to stress, so that a connection of the conducting layer 31 and the array substrate 121 is easily broken. In this embodiment, a curved surface is formed in the middle of the conducting layer 31, and the conducting layer 31 is relatively thin, has good flexibility, and can withstand sufficient stress. Therefore, during a bending process of the conducting layer 31, the connection between the conducting layer 31 and the array substrate 121 is not easily broken. The IC driver circuit unit 32 is mounted to a lower surface of the baseplate 31. The baseplate 31 is provided with a through hole. The conducting layer 31 is connected to a lower surface of the baseplate 42 through the through hole, and is electrically connected to the IC driver circuit unit 32. In comparison with the prior art, the conducting layer 31 and the IC driver circuit unit 32 in the binding area 3 are subjected to a structure inversion process such that when lines of the binding area 3 are bent, the connection between the conducting layer 31 and the array substrate 121 is not easily broken, and the yield of the touch panel is ensured.

In this embodiment, the light emitted by the backlight source is reflected to the first prismatic lens via the light guide plate. The first prismatic lens enhances the brightness of the light and acts on the diffusion sheet, so that the diffusion sheet provides a uniform surface light source for the second prismatic lens. The second prismatic lens further enhances the intensity of the light and reflects the light to the first polarizer. The color filter substrate receives the light reflected by the first polarizer. When the color filter substrate is combined with the array substrate, an upper surface of the second polarizer achieves the display effect. In comparation with the prior art, the display effect of this embodiment is maintained.

The touch panel of the prior art includes a glass cover for protecting an upper polarizer, but it causes a certain touch delay. In this embodiment, the glass cover and the sealant of the prior art are removed, and the user can input a touch command directly on the second polarizer without being affected by the glass cover, and the touch is no delay and more sensitive.

In this embodiment, a thickness of the second polarizer is adjusted from 0.074 mm to 0.215 mm, and a physical strength is increased by nearly three times. Therefore, the second polarizer is not easily damaged, and the glass cover is not required for protection.

In the prior art, an overall thickness of the touch panel is generally 1.722 mm, where a thickness of the glass cover is 0.55 mm, a thickness of the sealant is 0.1 mm, a thickness of the upper polarizer is 0.074 mm, a thickness of the color filter substrate is 0.125 mm, a thickness of the array substrate is 0.125 mm, a thickness of a lower polarizer is 0.071 mm, and a thickness of the backlight module is 0.677 mm. In this embodiment, a thickness of the touch panel is preferably 1.463 mm, where a thickness of the second polarizer (corresponding to the upper polarizer in the prior art) is 0.215 mm, a thickness of the array substrate is 0.4 mm, a thickness of the color filter substrate is 0.1 mm, a thickness of the second polarizer (corresponding to the lower polarizer in the prior art) is 0.071 mm, and a thickness of the backlight module is 0.677 mm. In comparison with the prior art, in this embodiment, the color filter substrate and the array substrate are inverted, that is, the array substrate is disposed on the upper surface of the color filter substrate, and the overall thickness of the touch panel is reduced such that the overall performance of the touch panel is ensured and the yield of the touch panel is maintained.

In comparison with the prior art, this embodiment removes the glass cover and the sealant in the prior art, and the thicknesses of the array substrate and the second polarizer are increased, and the thicknesses of the first polarizer and the backlight module remain unchanged. The physical strength of the array substrate, the backlight module, and the two polarizers are constant or large. Therefore, this embodiment can ensure or improve the yield of the touch panel. Since the glass cover and the sealant are removed, it prevents the touch panel from appearing yellow spots, stress marks, large warpage tolerances, poor fit, etc., thereby making the touch panel thinner. The yield of the touch panel is guaranteed while ensuring the overall performance of the touch panel. Specifically, the array substrate replaces the glass cover, and the length and the width of the array substrate are increased so that the size of the array substrate is adapted to the size of the glass substrate in the prior art. The thickness of the second polarizer is increased. When the second polarizer is closely attached to the array substrate, the hardness of the touch panel is increased to ensure that the touch panel is not damaged when the user directly touches the polarizer. In addition, the thickness of the color filter substrate is reduced, so that the overall thickness of the touch panel is reduced, and the performance and yield of the touch panel are ensured while reducing the thickness and weight of the touch panel.

Figure 4:
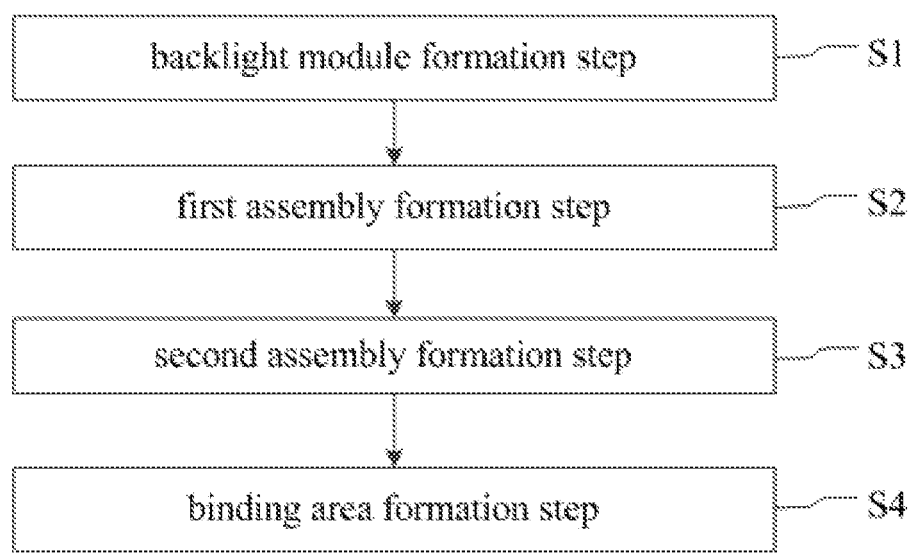
FIG. 4 is a flowchart of a manufacturing method of a touch panel of an embodiment of the present disclosure.

As shown in FIG. 4, an embodiment of the present disclosure further provides a manufacturing method of a touch panel, which includes the following steps S1 to S4.

In a backlight module formation step S1, a backlight module is formed on an upper surface of a baseplate of a frame. The backlight module includes a reflector, a light guide plate, a first prismatic lens, a diffusion sheet, a second prismatic lens, and a light-shielding adhesive. The reflector, the light guide plate, the first prismatic lens, the diffusion sheet, the second prismatic lens, and the light-shielding adhesive are sequentially disposed on the upper surface of the baseplate. The reflector is configured to reflect light and has good reflective performance. The light guide plate utilizes an optical grade acrylic plate to absorb the light from lamps on a surface of the optical grade acrylic plate. After light transmits to each light guide point, the reflected light will diffuse at various angles, and then the reflected light destroys a reflection condition and is emitted from a front of the light guide plate. The light guide plate can be uniformly illuminated by a plurality of light guide points which have different size of different density. The first prismatic lens enhances a brightness of the touch panel. The diffusion sheet provides a uniform surface light source for the touch panel. The backlight module further includes a backlight source, a double-sided adhesive layer, a light source driving circuit, and a frame, and these components are disposed on a left side of the light guide plate. The double-sided adhesive layer and the light source driving circuit are sequentially disposed on an upper surface of the backlight source. The frame is disposed between the reflector and the double-sided adhesive layer to support components above the double-sided adhesive layer and to ensure more light sources are incident on the light guide plate.

Figure 5:
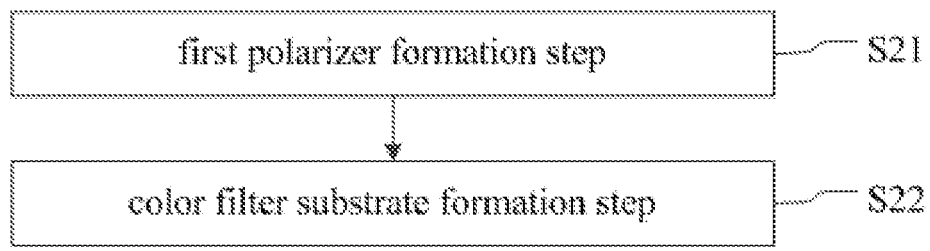
FIG. 5 is a flowchart of a first assembly formation step of the embodiment of the present disclosure.

As shown in FIG. 5, a first assembly formation step S2 includes the following steps S21 to S22. In a first polarizer formation step S21, a first polarizer is formed on an upper surface of the backlight module. Specifically, the first polarizer is formed on an upper surface of the second prismatic lens. A lower surface of the first polarizer is attached to the second prismatic lens by the light-shielding adhesive. In a color filter substrate formation step S22, a color filter substrate is formed on an upper surface of the first polarizer.

Figure 6:
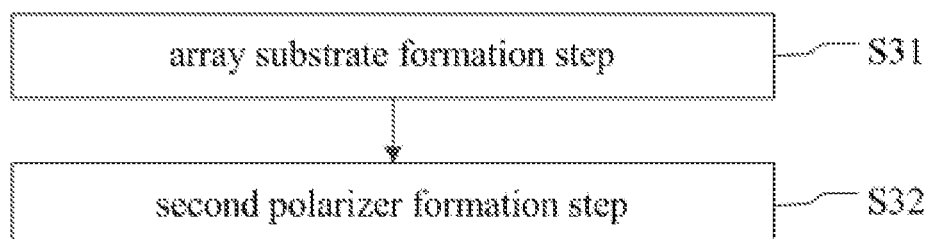
FIG. 6 is a flowchart of a second assembly formation step of the embodiment of the present disclosure.

As shown in FIG. 6, in a second assembly formation step S3, the second assembly is ground and polished such that the second assembly includes a circular arc section at a corner of its longitudinal cross-section. The second assembly formation step S3 includes the following steps S31 to S32. In an array substrate formation step S31, an array substrate is formed on an upper surface of the color filter substrate. The is subjected to a cutting process such that a size of the array substrate after cutting is the same as that of the prior art glass substrate and can be accommodated by the frame. An edge of the cut array substrate is ground and polished by a user, so that a first circular arc section is provided at a junction of a long side and a short side of the array substrate. A radius of the first circular arc section ranges from 0.13 mm to 0.16 mm, and the radius is preferably 0.15 mm. The first circular arc section can avoid a cutting crack at the edge of the array substrate after being cut, which causes the touch panel to have a risk of a screen being broken when performing a whole machine test. In a second polarizer formation step S32, a second polarizer is formed on and upper surface of the array substrate. The second polarizer is a hard-coating polarizer which is subjected to a hardened coating treatment that guarantees a hardness of 8H on its surface, thereby ensuring the hardness of the touch panel. It ensures that the touch panel is not damaged when the user directly touches the polarizer. There is a second circular arc section at a junction of a long side and a short side of the second polarizer. A radius of the second circular arc section is the same as the radius of the first circular arc section. The first circular arc section extends to the second circular arc section, and centers of both are at the same position, so that an edge of the second assembly is smoothly and closely fits the frame. In other embodiments, the user can also directly set a circular arc section at the long side and the short side of the second polarizer, which can ensure the array substrate and the second polarizer closely fit the edge of the frame, and ensures that a screen of the touch panel does not break during the whole machine test.

In a binding area formation step S4, a binding area is disposed on the touch panel. The binding area includes a conducting layer and an IC driver circuit unit. One end of the conducting layer is attached to a lower surface of the array substrate, and the other end is connected to the lower surface of a baseplate to prevent the array substrate from easily breaking during the bending the conducting layer. The IC driver circuit unit is mounted to a lower surface of the baseplate. The baseplate is provided with a through hole. The conducting layer passes through the through hole and is electrically connected to the IC driver circuit unit.

In the prior art, an overall thickness of the touch panel is generally 1.722 mm, where a thickness of the glass cover is 0.55 mm, a thickness of the sealant is 0.1 mm, a thickness of the upper polarizer is 0.074 mm, a thickness of the color filter substrate is 0.125 mm, a thickness of the array substrate is 0.125 mm, a thickness of a lower polarizer is 0.071 mm, and a thickness of the backlight module is 0.677 mm. In this embodiment, a thickness of the touch panel is preferably 1.463 mm, where a thickness of the upper polarizer is 0.215 mm, a thickness of the array substrate is 0.4 mm, a thickness of the color filter substrate is 0.1 mm, a thickness of the lower polarizer is 0.071 mm, and a thickness of the backlight module is 0.677 mm. In comparation with the prior art, in this embodiment, the color filter substrate and the array substrate are inverted, that is, the overall thickness of the touch panel is reduced such that the overall performance of the touch panel is ensured and the yield of the touch panel is maintained.

In comparison with the prior art, this embodiment removes the glass cover and the sealant in the prior art, and the thicknesses of the array substrate and the second polarizer are increased, and the thicknesses of the first polarizer and the backlight module remain unchanged. The physical strength of the array substrate, the backlight module, and the two polarizers are constant or large. Therefore, this embodiment can ensure or improve the yield of the touch panel. Since the glass cover and the sealant are removed, it prevents the touch panel from appearing yellow spots, stress marks, large warpage tolerances, poor fit, etc., thereby making the touch panel thinner. The yield of the touch panel is guaranteed while ensuring the overall performance of the touch panel. Specifically, the array substrate replaces the glass cover, and the length and the width of the array substrate are increased so that the size of the array substrate is adapted to the size of the glass substrate in the prior art. The thickness of the second polarizer is increased. When the second polarizer is closely attached to the array substrate, the hardness of the touch panel is increased to ensure that the touch panel is not damaged when the user directly touches the polarizer. In addition, the thickness of the color filter substrate is reduced, so that the overall thickness of the touch panel is reduced, and the performance and yield of the touch panel are ensured while reducing the thickness and weight of the touch panel.

The above description is only preferred embodiments of the present disclosure, and it should be noted that those skilled in the art can also make several improvements and modifications without departing from principles of the present disclosure. These improvements and modifications should also be considered as protection of the present disclosure.

What is claimed is:

1. A touch panel, comprising:
    a backlight module;
    a first assembly disposed on a surface of the backlight module; and
    a second assembly disposed on a surface of the first assembly away from the backlight module;
    wherein the first assembly comprises:
    a first polarizer disposed on the surface of the backlight module; and
    a color filter substrate disposed on a surface of the first polarizer away from the backlight module; and
    wherein the second assembly comprises:
    an array substrate disposed on a surface of the color filter substrate away from the backlight module; and
    a second polarizer disposed on a surface of the array substrate away from the backlight module;
    wherein a longitudinal cross-section of the second assembly is quadrangular, comprising a long side and a short side, and the longitudinal cross-section of the second assembly comprises a circular arc section disposed at a junction of the long side and the short side.

2. The touch panel as claimed in claim 1, wherein the backlight module comprises:
    a reflector;
    a light guide plate disposed on a surface of the reflector;
    a first prismatic lens disposed on a surface of the light guide plate away from the reflector;
    a diffusion sheet disposed on a surface of the first prismatic lens away from the reflector; and
    a second prismatic lens disposed on a surface of the diffusion sheet away from the reflector;
    wherein the second prismatic lens is attached to the first polarizer.

3. The touch panel as claimed in claim 1, wherein a length of the color filter substrate is less than a length of the array substrate, and a width of the color filter substrate is less than a width of the array substrate.

4. The touch panel as claimed in claim 1, further comprising:
    a baseplate, wherein the reflector is mounted to a surface of the baseplate;
    a conducting layer, wherein one end of the conducting layer is attached to another surface of the array substrate, and another end of the conducting layer is connected to another surface of the baseplate; and
    an integrated circuit (IC) driver circuit unit mounted to the another surface of the baseplate and electrically connected to the conducting layer.

5. The touch panel as claimed in claim 4, wherein material of the conducting layer comprises molybdenum oxide.

6. The touch panel as claimed in claim 1, wherein the first polarizer comprises a multilayer reflective polarizer, and the second polarizer comprises a hard-coating polarizer.

7. The touch panel as claimed in claim 1, wherein a thickness of the array substrate ranges from 0.35 mm to 0.45 mm, a thickness of the color filter substrate ranges from 0.095 mm to 0.11 mm, and a thickness of the second polarizer ranges from 0.20 mm to 0.22 mm.

8. A manufacturing method of a touch panel, comprising following steps:
    performing a backlight module formation step for forming a backlight module;
    performing a first assembly formation step for forming a first assembly on an upper surface of the backlight module; and
    performing a second assembly formation step for forming a second assembly on an upper surface of the first assembly, wherein in the second assembly formation step, the second assembly is ground and polished such that the second assembly comprises a circular arc section at a corner of its longitudinal cross-section;
    wherein in the first assembly formation step, the method comprises following steps:
    performing a first polarizer formation step for forming a first polarizer on the upper surface of the backlight module; and
    performing a color filter substrate formation step for forming a color filter substrate on an upper surface of the first polarizer; and
    wherein in the second assembly formation step, the method comprises following steps:
    performing an array substrate formation step for forming an array substrate on an upper surface of the color filter substrate; and
    performing a second polarizer formation step for forming a second polarizer on an upper surface of the array substrate.

\* \* \* \* \*